US010977168B1

(12) United States Patent
Sanevelly et al.

(10) Patent No.: US 10,977,168 B1
(45) Date of Patent: Apr. 13, 2021

(54) AUTOMATION TESTING TOOL FRAMEWORK

(71) Applicant: Anthem, Inc., Indianapolis, IN (US)

(72) Inventors: Raja Sanevelly, Cumming, GA (US); Sam Kyatham, Alpharetta, GA (US)

(73) Assignee: Anthem, Inc., Indianapolis, IN (US)

( * ) Notice: Subject to any disclaimer, the term of this patent is extended or adjusted under 35 U.S.C. 154(b) by 0 days.

(21) Appl. No.: 16/784,831

(22) Filed: Feb. 7, 2020

Related U.S. Application Data

(60) Provisional application No. 62/953,765, filed on Dec. 26, 2019.

(51) Int. Cl.
*G06F 11/00* (2006.01)
*G06F 11/36* (2006.01)

(52) U.S. Cl.
CPC ...... *G06F 11/3688* (2013.01); *G06F 11/3684* (2013.01)

(58) Field of Classification Search
CPC ............. G06F 11/0706; G06F 11/0718; G06F 11/3612; G06F 11/3636; G06F 11/366; G06F 11/3668; G06F 11/3672; G06F 11/3688
USPC ......................................................... 714/38.1
See application file for complete search history.

(56) References Cited

U.S. PATENT DOCUMENTS

| | | | | |
|---|---|---|---|---|
| 6,584,569 B2 * | 6/2003 | Reshef | ................... | G06F 21/554 709/203 |
| 2003/0131290 A1 * | 7/2003 | Weinberg | ............ | G06F 11/3688 714/46 |
| 2007/0234328 A1 * | 10/2007 | Wilson | ................ | G06F 11/3672 717/162 |
| 2010/0287418 A1 * | 11/2010 | Khanna | ................ | G06F 11/2294 714/45 |
| 2013/0232474 A1 * | 9/2013 | Leclair | ................ | G06F 11/3668 717/134 |
| 2014/0068559 A1 * | 3/2014 | Szocs | ........................ | G06F 8/70 717/120 |
| 2014/0289561 A1 * | 9/2014 | Majumdar | ............ | G06F 11/263 714/32 |
| 2016/0328316 A1 * | 11/2016 | Balsavias | ............ | G06F 11/3692 |
| 2019/0235997 A1 * | 8/2019 | Mitchell | ................ | G06N 20/00 |

* cited by examiner

*Primary Examiner* — Sarai E Butler
(74) *Attorney, Agent, or Firm* — Morgan, Lewis & Bockius LLP

(57) ABSTRACT

A method of testing a web-based application comprising: at a computing device: receiving a test procedure, the web-based application having an associated web-based application code, the test procedure including at least one testing step comprised of at least an action attribute and an element attribute; for each of the at least one testing steps: identifying an action handler based on the action attribute; generating at least one instruction, by the action handler, and in accordance with a determination that the testing step is an interaction testing step and that there is a value attribute associated with the interaction testing step, modifying the at least one instruction based on the value attribute associated with the interaction testing step; and causing the web-driver to execute the at least one instruction on an identified section of web-based application code corresponding to the element attribute to perform an operation on the web-based application.

24 Claims, 8 Drawing Sheets

FIG. 4D

AUTOMATION TESTING TOOL FRAMEWORK

CROSS-REFERENCE TO RELATED APPLICATIONS

This application claims the benefit of U.S. Provisional Patent Application No. 62/953,765 filed on Dec. 26, 2019 entitled "Automation Testing Tool Framework", which is incorporated by reference in its entirety.

BACKGROUND OF THE INVENTION

The present invention generally relates to automation tools and, more particularly, to automation testing tools for computer applications.

BRIEF SUMMARY OF THE INVENTION

Without limiting the scope of the appended claims, after considering this disclosure, and particularly after considering the section entitled "Detailed Description," it will be evident how the aspects of the various aspects are implemented and used to automate testing of a computer application, given a set of user-defined steps.

In one aspect there is a method or a system of testing a web-based application, the method or system comprising: at a computing device: receiving a test procedure for testing the web-based application, the web-based application having an associated web-based application code, the test procedure including at least one testing step, each of the at least one testing steps being one of: an interaction testing step and an expectation testing step, each of the at least one testing steps including at least an action attribute and an element attribute; for each of the at least one testing steps: identifying an action handler based on the action attribute; generating at least one instruction, by the action handler, based on the action attribute and in accordance with a determination that the testing step is an interaction testing step and that there is a value attribute associated with the interaction testing step, modifying the at least one instruction based on the value attribute associated with the interaction testing step; and causing the web-driver to execute the at least one instruction on an identified section of web-based application code corresponding to the element attribute to perform an operation on the web-based application.

In one aspect, the at least one testing step includes a first step and a last step, the first step being an interaction testing step and the last step being an expectation testing step.

In one aspect, the element attribute corresponds to a unique identifier of a web element of the web-based application.

In one aspect, the test procedure is a non-compilable test script written by a user with no experience drafting computer source code.

In one aspect, the operation on the web-based application includes: a web page opening operation, a wait operation, a type operation, a click operation, and/or an operation to extract a value from the web-based application.

In one aspect, when the testing step is an open web-application step: generating the at least one instruction includes: generating a first instruction and a second instruction and causing the web-driver to execute the first instruction to open an associated web-browser, modifying the at least one instruction includes: modifying the second instruction to include a web-page name based on the value attribute, and causing the web-driver to execute the at least one instruction includes: executing the second instruction with the web-page name based on the value attribute to open the web-based application.

In one aspect, when the testing step is a type step: modifying the at least one instruction includes: modifying the at least one instruction to include a text string based on the value attribute, and causing the web-driver to execute the at least one instruction includes: modifying the section of web-based application code to simulate typing the text string.

In one aspect, when the testing step is a click step, causing the web-driver to execute the at least one instruction includes modifying the section of web-based application code to simulate a mouse-click action.

In one aspect, when the testing step is a wait step, modifying the at least one instruction includes modifying the at least one instruction to include a number value based on the value attribute, causing the web-driver to execute the at least one instruction includes causing the web-driver to wait an amount of time corresponding to the number value.

In one aspect, when the testing step is a select step, modifying the at least one instruction includes modifying the at least one instruction to include a text string based on the value attribute, causing the web-driver to execute the at least one instruction includes causing the web-driver to select one option corresponding to the text string out a plurality of options.

In one aspect, when the testing step is an expectation step, causing the web-driver to execute the at least one instruction includes causing the web-driver to extract a respective value characteristic from the web-based application and compare the value characteristic to the value attribute to determine whether there is a match.

In one aspect, the method further comprises: selecting a web handler and/or web-driver based on determining a type of the web-based application before determining an action handler.

In one aspect, the action attribute may correspond to a list of predetermined action attributes.

BRIEF DESCRIPTION OF THE SEVERAL VIEWS OF THE DRAWINGS

The foregoing summary, as well as the following detailed description of the disclosed invention, will be better understood when read in conjunction with the appended drawings of an exemplary embodiment. It should be understood, however, that the invention is not limited to the precise arrangements and instrumentalities shown.

In the drawings:

FIG. 3 is an example of a web-application and the associated DOM according to at least one embodiment of the invention;

FIG. 4C-4D is an example of a web-application and associated DOM before and after undergoing a selection automation test, respectively, according to at least one embodiment of the invention.

DETAILED DESCRIPTION OF THE INVENTION

Figure 1:
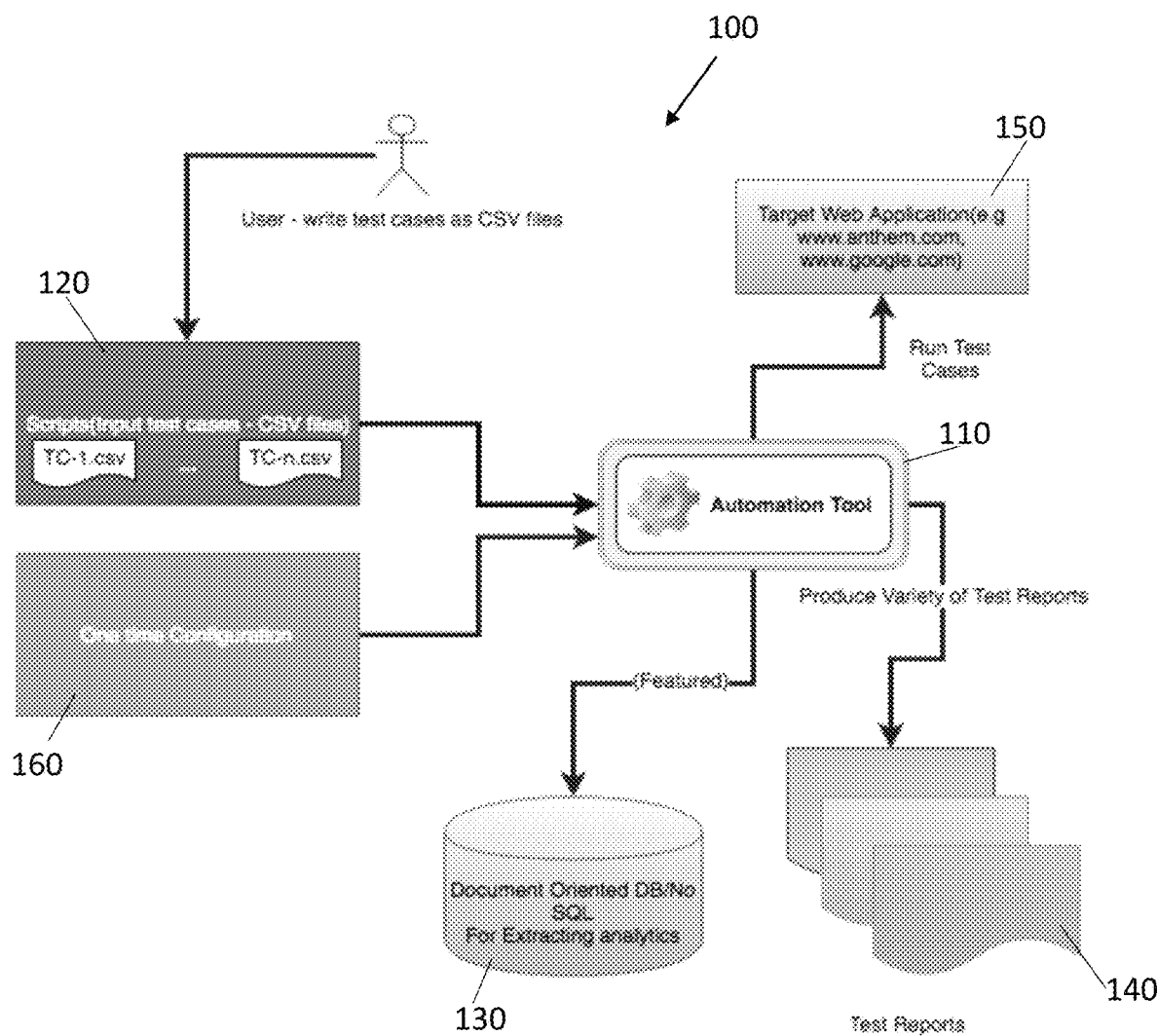
FIG. 1 illustrates a block diagram that illustrates an example system for improving the automatic testing of a web-application functionalities according to at least one embodiment of the invention.

In some aspects, methods and systems described herein provide web-application test case results generated by a lightweight automation testing tool framework which takes, as an input, simple user specified steps without compromising the quality of the test. The automation testing tool framework may run in the background, hiding all technological complexities (e.g. coding, logic, report generation, underlying frameworks) from the user, while assisting in achieving deliverables within a short span of time. The user specified steps (e.g. test scripts) may be defined by an action, a location where the action should be executed, and optionally a value associated with the action. The user specified steps provided to the automation testing tool framework may be in a non-compilable plain text file which is composed of wording and/or terms which are intuitive and easily understood by those outside the art, requiring no specialized programming skills or expertise in an existing framework.

Previous automation testing tool frameworks ("frameworks") could not provide the same level of functionality, ease of use, and time requirements as the aspects described herein with only a simple set of steps. For example, "layman's terms" steps may be used as a template for developing a framework test script, however existing frameworks require additional programming in order to execute the test script, a process which must be repeated for each new test script or if the web-application undergoes a change. It is also often the case that existing frameworks will cease to properly function (e.g. break) when the web-application undergoes a change. In these cases the previous frameworks require time and effort to debug and change the underlying code in order to accommodate the changes in the web-application. Typically, in order to make the necessary changes to the underlying code, a programmer having knowledge of the existing framework and the corresponding programming language is required.

In some aspects, due to design aspects related to how the script writer drafts new test scripts, among other features, even when new test scripts are presented or a web-application (e.g. website) undergoes a change, the automation testing tool framework is capable of running a test without the need for additional programming.

In agile development, teams are expected to develop, test, automate and deploy user scripts and features incrementally within a fast timeline. Often times, automation cannot be delivered within the fast timeline due to the complexity of building the automation test and the effort required by the development teams. Furthermore, supporting specific automation use cases may require considerable time and effort since the automation testing tool frameworks API/actions may not be intuitive or understandable. It is also common during the evaluation of new technology, or as new business demands arise, that new test cases need to be developed. Often times these new test cases are not supported by the existing framework and a new framework must be used. These new frameworks may not provide any type of conversion capabilities to take existing test cases used with the current framework and move them into the new framework. In this scenario, the existing test cases are discarded and must be re-developed in the new framework, which may require considerable resources. In at least some embodiments described herein, test scripts written by laymen can be implemented without additional computer code using exemplary automation frameworks as described herein.

Referring to the drawings in detail, wherein like reference numerals indicate like elements throughout, there is shown in the Figures, system and methods for improving the automated testing of web-applications, generally designated, in accordance with an exemplary embodiment of the present invention.

FIG. 1 shows a block diagram that illustrates a system 100 for improving automated testing of web-applications according to at least one aspect of the present invention. While some example features are illustrated, various other features have not been illustrated for the sake of brevity and so as not to obscure pertinent aspects of the example aspects disclosed herein. To that end, in at least one aspect, the system 100 may include an automation framework tool to be run on a web-application, one or more sets of testing procedures and access to a database for retrieving and storing information. For example, the system 100, shown in FIG. 1, may include an automation tool 110, one or more test scripts 120, and a database 130.

The automation tool 110 may be a software program executed on a computing device, configured to receive the test script 120, and execute a series of commands on a target application 150 according to the test script 120. The automation tool 110 may return a test report 140 based on the outcome of the series of commands specified by the test script 120. In some embodiments, where the target application is a web-based application, the automation tool 110 may be configured to work in conjunction with a web-driver corresponding to the web-based application (or corresponding web browser) designated for testing. Detailed functionality of the automation tool 110 is described below.

During initial setup of the automation tool 110, the automation tool 110 may execute a one-time configuration program 160 that includes information regarding database 130, and email addresses of stakeholders, or other interested parties, who wish to receive test reports 140. Once the automation tool 110 has received the one-time configuration program 160 for a particular computer application under test, the automation tool 110 may not have to execute the one-time configuration program 160 for future tests.

The target application 150 may be any computer software application configured to interact with the automation tool 110. In some embodiments, such as the embodiment shown in FIG. 1, the target application 150 (also referred to herein as target application 150) may be any website or other web based application compatible with the automation tool 110. For example, the target application 150 may be developed based on a markup language such as W3C (e.g. HTML, CSS, Javascript).

A test script 120, described herein, refers to an ordered list of steps (also referred to herein as "testing steps") executed by the automation tool 110 on the target application 150. In some embodiments, each step of a respective test script 120 may include a series of attributes which are recognizable by the automation tool 110. These attributes may also be understandable to one not skilled in computer programming, thereby making implementation of a test script easier for "laymen" (e.g., testing developers or quality control engineers). The test scripts 120 may define a sequence of steps a user of a target application 150 may take to access a one or more functions of the web-application (e.g. log-in, text input, mouse-actions, page navigation). These steps may also correspond to different types of tests that script writers such as testing developers and/or quality control engineers may desire to test (e.g. user story, security, defect). For example, in embodiments where the target application is a web application, the steps may correspond to opening a web-browser, navigating to a website, typing a username and password, and attempting a log-in in order to test the log-in functionality of the website.

In some embodiments, each step may be defined by at least one of the following attributes: an action attribute, an element attribute, and a value attribute. In some embodiments, to limit cognitive burden on laymen script writers, each step may only be defined by these three attributes at most.

The action attribute may correspond to an action to be performed by the automation tool 110 on the target application 150. The test script 120, and corresponding automation tool 110, may be configured to execute a plurality of actions, each action specifiable in the test script 120 by the action attribute assigned by the script writer. For example, the action may be an interaction action that when executed by the automation tool 110, causes the automation tool 110 (via a web driver) to interact with the target application 150 (e.g. open, close, type, click, wait, select). In another example, the action may be an observation or expectation action that when executed by the automation tool 110, causes the automation tool 110 (via a web driver) to compare an element or value of the target application 150 to an expected outcome (e.g. expect this url, expect this error, expect this value) and determine whether the element or value of the target application 150 was a value expected by the script writer of the test script.

The element attribute may identify a unique web element of the target application 150 where the action specified by the action attribute is to be executed. Examples of elements in applications include buttons, text boxes, and images, among others. The element attribute may be dependent upon the markup language used to develop the target application 150. For example, the element attribute may correspond to a unique document object model (DOM) or hypertext markup language (HTML) element identifier (e.g. xpath, id, name, linktext).

The value attribute may be a value corresponding to the element attribute. For example, the value attribute may be a value the script writer intends to set for an input box element in a web application. The value attribute may be optionally required by the action attribute depending on the type of action required. In some embodiments, a value attribute may not be required for certain actions such as an open application action. In some embodiments, a value attribute may be required for certain actions, such as an expectation action. For example, the value attribute may correspond to an expected value found at the element of the target application 150. In another example, the test script may include value attributes associated with the steps in the login procedure described here. In the example, the value attributes may include text corresponding to the username and password and an expected error message resulting from a failed log-in attempt.

Test scripts 120 may be created by a user (e.g., automation engineer, quality control/assurance technician, etc.) without requiring any specific knowledge of a programming language (e.g. Python, Ruby, Javascript, C++). Test scripts 120 may be a plain text file (e.g. a comma-separated value (CSV) file). The steps of the plain text scripts 120 may be separated by line within the plain text file, while the action, element and value attributes are separated by a common delimitation.

Test scripts may be created on any text editor, workbook program or other software capable of creating plain text files. Table 1 shows an example test script file corresponding to the steps needed to test a log-in functionality of a website.

TABLE 1

Example test script file created by an end user

| Action | Element | Value |
|---|---|---|
| Open | _url | https://www.somewebsite.com |
| Type | _id::txtUsername | someusername |
| Type | _id::txtPassword | Somepassword |
| Click | _id::btnLogin | |
| Expect | _id::loginCmp_busError | *Looks like we can't complete your login.* |
| Expect | _id::txtPassword | |

Figure 3:
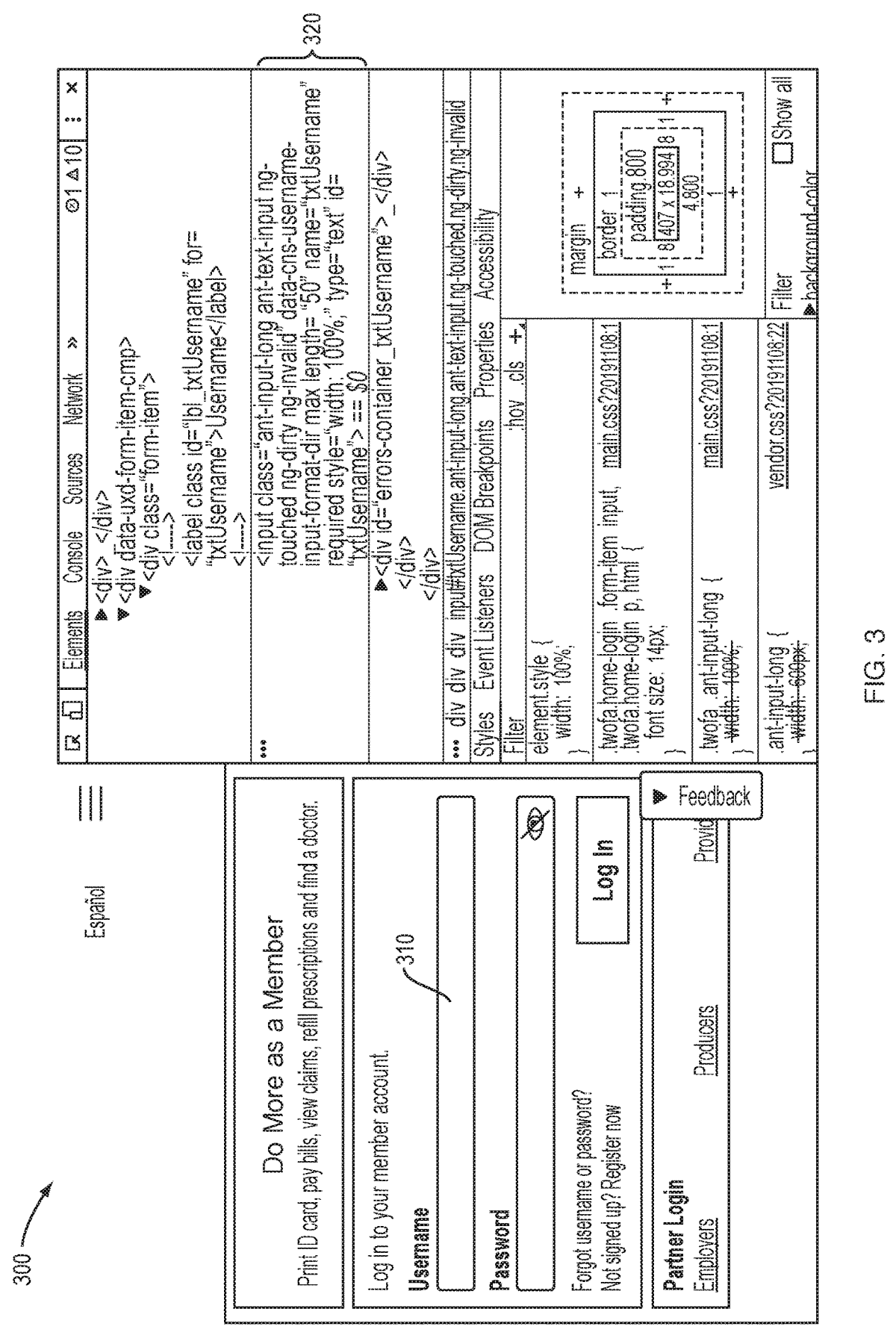

Referring to Table 1, where step attributes are separated by column and steps are separated by row, the automation tool 110 may be configured to simulate the above steps on a target application 150 and return a corresponding test report 140 (described in more detail below). The first column of the example test script corresponds to the action attribute. The action attribute may correspond to a list of predetermined action attributes which the automation tool 110 may be configured to recognize and execute. The list of recognized action attributes may be words or terms that a user not familiar with or experienced in the art would understand. The second column of the example test script corresponds to the element attribute. The specific syntax of the element attribute of the test script 120 may correspond to both the target application 150 and automation tool 110. For example, in the second row of Table 1 the element attribute is "_id::txtUsername". The automation tool 110 may be configured to read the test script 120 element attribute and search the DOM of a target application 150 for the associated element attribute ("id") having the specified input (e.g. "txtUsername") in the test script. An example is shown in FIG. 3, where the portion of a DOM for a login page 300 of a website is shown. The HTML element 310 representative of an input box for a user name field and associated with the code portion 320 is shown. The element attribute (e.g., _id::txtUsername) has a unique value associated with code portion 320. In this way the element attribute may be used to specify and locate the HTML element 310 associated with code portion 320 by traversing through the code of the DOM to identify code portion 320 having a similar element name to the element attribute specified in the test script. It will be understood that any element in a browser may be identified in a similar manner.

Referring back to Table 1, the third column of the example test script corresponds to the value attribute. As discussed herein, in some embodiments, some action attributes may require a value attribute. For example, the "Type" action attribute in rows 2 and 3 require some value attribute corresponding to the desired text to add to input boxes of a web application, while the "Click" action attribute in row 4 only requires an element attribute, and no value attribute, to function. The "Click" action does not require a value attribute because the corresponding function, a click performed on a web application, does not require a value to perform the function. Some action attributes may optionally allow a non-empty value attribute. For example, rows 5 and 6 both use the same action attribute "Expect" but both do not have entries for the value attribute. The automation tool 110 may be configured to accept a non-empty value attribute having text strings, wildcard characters, or any combination thereof.

The automation tool 110 may be configured to interpret a first step as the first row of the test script 120, the second step as the second row of the test script 120 and so on. It will be understood by those skilled in the art that an automation tool 110 may be configured to receive a test script 120 having different variations on the ordering of the action, element, and value attributes presented in Table 1. Additionally, step attributes and steps may be separated by means other than those described above such that the automation tool 110 is able to distinguish the individual steps and the attributes which define them.

Figure 2:
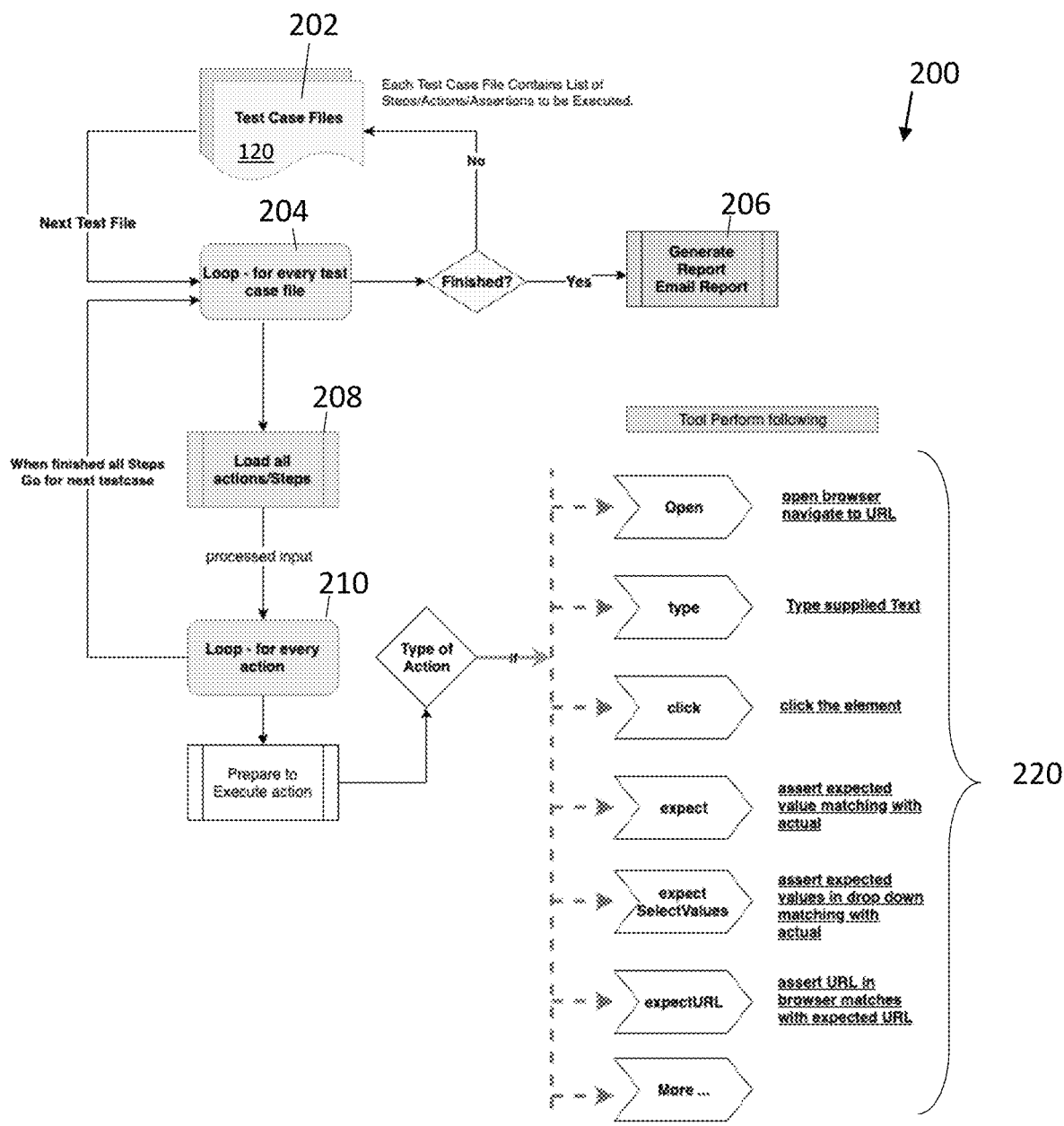
FIG. 2 is a flow chart for a method of implementing the system of FIG. 1 according to at least one embodiment of the invention.

Referring to FIG. 2, there is shown a method 200 implemented by the automation tool 110. In some embodiments, the automation tool 110 may be configured to receive a test script 120 from a database 130 or other location, perform each of the steps of the test script 120 and generate a test report 140. While the example in FIG. 2 refers to a web-based application as the target application 150, in other embodiments other applications may be utilized rather than web-based application. However, for ease of reference, the exemplary embodiments described in FIG. 2 will refer to a web-based application.

At step 202, the automation tool 110 may be configured to receive a test procedure for testing a web-based application with associated web-based application code. The automation tool 110 may receive the test scripts 120 by input into the automation tool 110 directly or saved to a specific directory that the automation tool 110 is configured to access. Automation tool 110 may be configured to receive multiple test scripts 120 and process them sequentially at step 204 before generating a test report 140 at step 206.

While the automation tool 110 is executing a test script, the automation tool 110 may input or load (at step 208) one or more of the steps in the test script 120 for further processing.

At step 210, for each step in the test script, the automation tool 110 may identify one or more action handlers, such as action handlers 220, based on the action attribute specified in the test script. For example, the automation tool 110 may perform those steps on the web-driver by implementing specific handlers 220. The handlers 220 may represent a portion of code that is executed in the background which, through a web-browsers driver application programming interface (API), which may cause an action to be performed on the target application 150. The web-driver and action handlers 220 may be processors configured to execute instructions based on computer code in at least one embodiment. Typical web-browser API includes code for automation capabilities which is utilized by the handlers 220. Handlers 220 may implement a generic action interface method which may vary based on an associated action. By utilizing the web-browser API the handlers 220 may cause the target application 150 to perform the steps of the test script 120. Also, by utilizing the web-browsers API to execute/simulate the actions necessary to perform the steps of a given test script 120, new and existing tests may be run on a target application 150 without the need for any new code to be written for the automation tool 110.

Continuing at step 210, for each step in the test script, a respective action handler of the plurality of action handlers 220 may perform a specific function by generating at least one instruction for execution of a function at the target application 150 based on the action attribute. Table 2, below, presents a list of some action attributes recognized by automation tool 110 and a description of the function of the associated handler 220. It will be understood that automation tool 110 may be configured to recognize other action attributes having actions different than the ones listed in Table 2. Additionally, action attributes classified by synonymous words or terms having similar meanings may be recognized by automation tool 110. Automation tool 110 may be configured to associate one or more action attribute terms with a single associated handler function.

TABLE 2

Example recognized action attributes

| Action Attribute | Associated Handler Function |
|---|---|
| Open | Open browser window to specified value attribute webpage |
| Type | Type specified value attribute in specified element |
| Click | Simulate mouse click on specified element |
| Select | Selects a specified value attribute from a dropdown list |
| Wait | Causes web-driver to wait a specified value attribute amount of time |
| Expect | Checks to see if specified element matches optionally provided value attribute |

Referring to Table 2, the "Open" action attribute may correspond to a handler 220 which takes as its input an element attribute and value attribute. The handler 220 corresponding to "Open" action (herein referred to as the "'Open' handler") may issue a first instruction to cause the web-driver to launch the associated browser. The "Open" handler 220 may issue a second instruction to cause the web-driver to type the supplied value attribute in a target application 150 element identified by the element attribute (e.g. a URL bar).

The "Type" action attribute may correspond to a handler 220 which takes as its input an element attribute and value attribute. The handler 220 corresponding to "Type" (herein referred to as the "'Type' handler") may issue an instruction to cause the web-driver to type the supplied value attribute in a target application 150 element identified by the element attribute (e.g. a username field).

The "Click" action attribute may correspond to a handler 220 which takes as its input an element attribute. The handler 220 corresponding to "Click" (herein referred to as the "'Click' handler) may issue an instruction to cause the web-driver to simulate clicking on an element identified by the element attribute (e.g. a login button).

The "Select" action attribute may correspond to a handler 220 which takes as its input an element attribute and an optional value attribute. The handler 220 corresponding to "Select" (herein referred to as the "'Select' handler") may issue an instruction to cause the web-driver to causing the web-driver to select one option of a plurality of options corresponding to the value attribute of a target application 150 element identified by the element attribute (e.g. a selection dropdown menu).

The "Wait" action attribute may correspond to a handler 220 which takes as its input an element attribute and value attribute. The handler 220 correspond to "Wait" (herein referred to as the "'Wait' handler") may issue an instruction to cause the web-driver to wait the specified value attribute amount of time before proceeding to the next step of a test script 120 (e.g. wait 10 seconds). The "Wait" handler may optionally require an element attribute.

The "Expect" action attribute may correspond to a handler 220 which takes as its input an element attribute and optional value attribute. The handler 220 corresponding to "Expect" (herein referred to as the "'Expect' handler") may issue an instruction to cause the web-driver to extract a respective value characteristic from a target application 150 element identified by the element attribute (e.g. an error message) and compare the value characteristic to the specified value attribute to determine whether there is a match and in response to determining that there is a match, updating a testing script metric to indicate a successful testing step and in response to determining that there is no match, updating a testing script metric to indicate an unsuccessful testing step (e.g. pass/fail result). Handlers 220 which cause a change to, or perform an action on the web-application may be classified as interaction handlers (e.g. "Open", "Type", "Click"). Handlers 220 which read data from the web-application and compare that data to a user specified input may be classified as an expectation handler ("Expect"). An expectation handler may be the final step in a test script 120. The test script 120 may include multiple expectation handlers. Expectation steps executed by expectation handlers may be interspersed throughout a test script 120 such that there are interaction steps occurring before and/or after the expectation step.

Referring back to step 210, in some embodiments, in accordance with a determination that the corresponding testing step is an interaction testing step and that there is a value attribute associated with the interaction step, a respective action handler of the plurality of action handlers 220 may modify the at least one instruction to execute at the target application 150 based on the value attribute associated with the interaction testing step. For example, upon determining that the testing step is a "Type" step and that there is a user-supplied string of text in the value attribute the "Type" handler may modify the instruction to include the supplied string of text resulting in the supplied string of text being typed on the target application 150.

Continuing at step 210, for each step in the test script, a respective action handler of the plurality of action handlers 220 may transmit the at least one instruction to the web-driver and cause the web-driver to execute the at least one instruction on an identified section of web-based application code corresponding to the element attribute to perform an operation on the web-based application. For example, upon determining that the testing step is a "Click" step the "Click" handler may transmit an instruction to simulate a mouse click at a location on the target application 150 corresponding to a log-in button based on the supplied element attribute (e.g. "_id::btnLogin").

Figure 4A:
FIG. 4A-4B is an example of a web-application and associated DOM before and after undergoing a typing automation test, respectively, according to at least one embodiment of the invention.
Figure 4B:
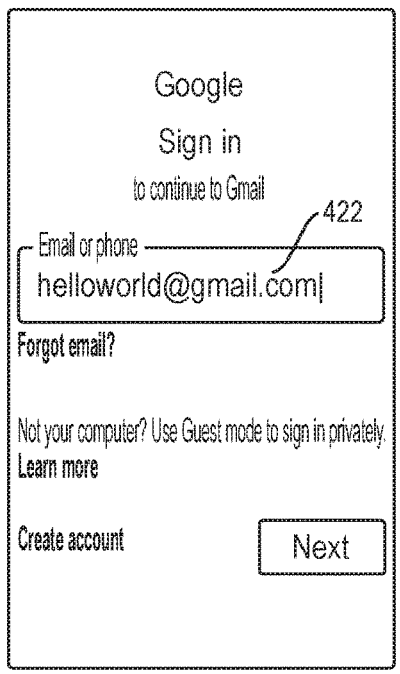
Figure 4B:
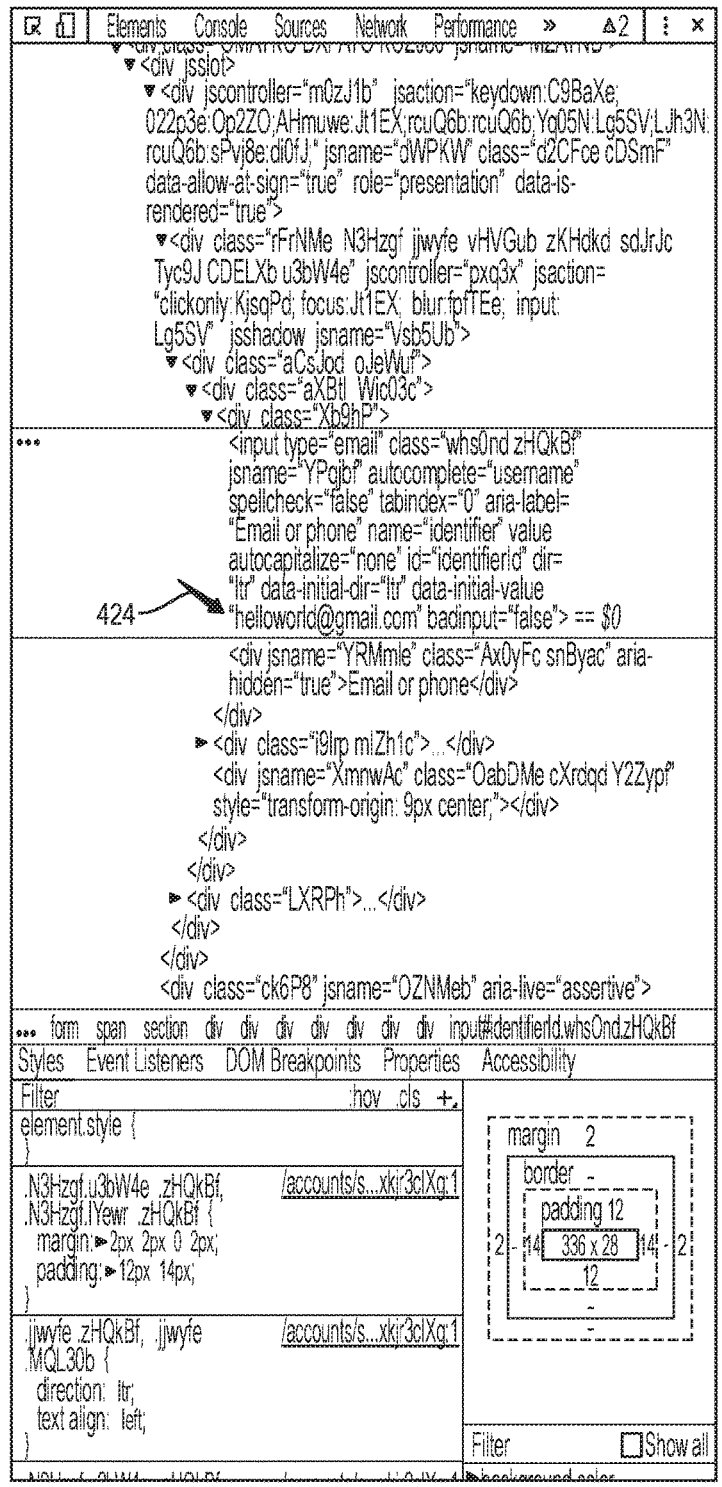

Examples of the steps performed in the method 200 of FIG. 2 are described in FIGS. 4A-4D. Referring to FIG. 4A, the automation tool 110 may receive a test script 120 having a step to type a value into an input field (e.g. email input field 412) of a target application 150 (e.g. sign-in page 410). In this example, the automation tool 110 first identifies an associated handler 220 by evaluating the action attribute specified in the step. The associated handler 220 is identified as a "Type" handler (see Table 2). The "Type" handler then searches through the DOM of the sign-in page 410 and locates the input field DOM element 414 based on the element attribute provided in the step. Referring now to FIG. 4B, the "Type" handler then simulates typing the specified value attribute into the email input field 412 of FIG. 4A by modifying a targeted DOM element attribute 424 resulting in the email input field 422 including the text "helloworld@gmail.com".

Figure 4C:
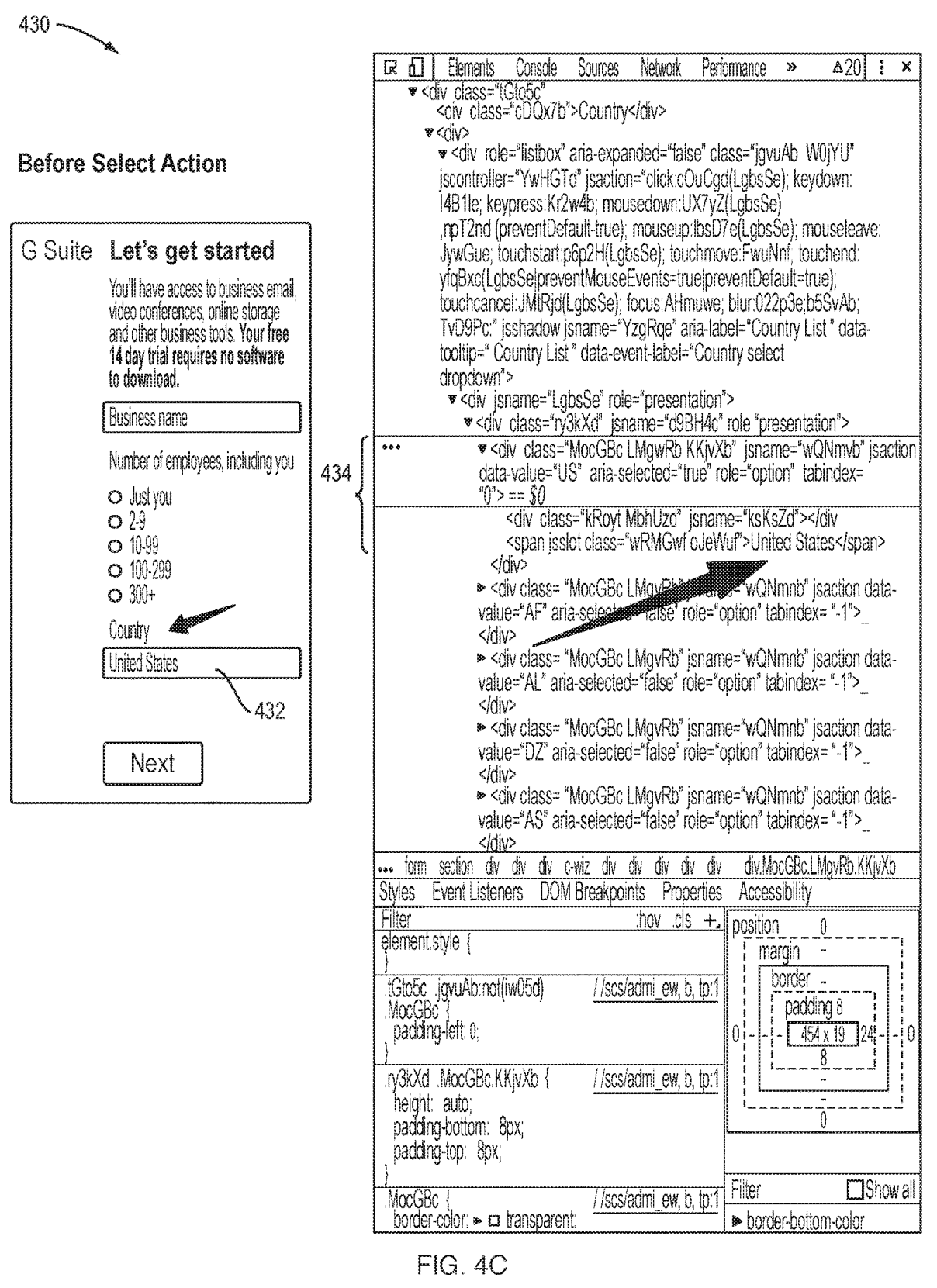
Figure 4D:
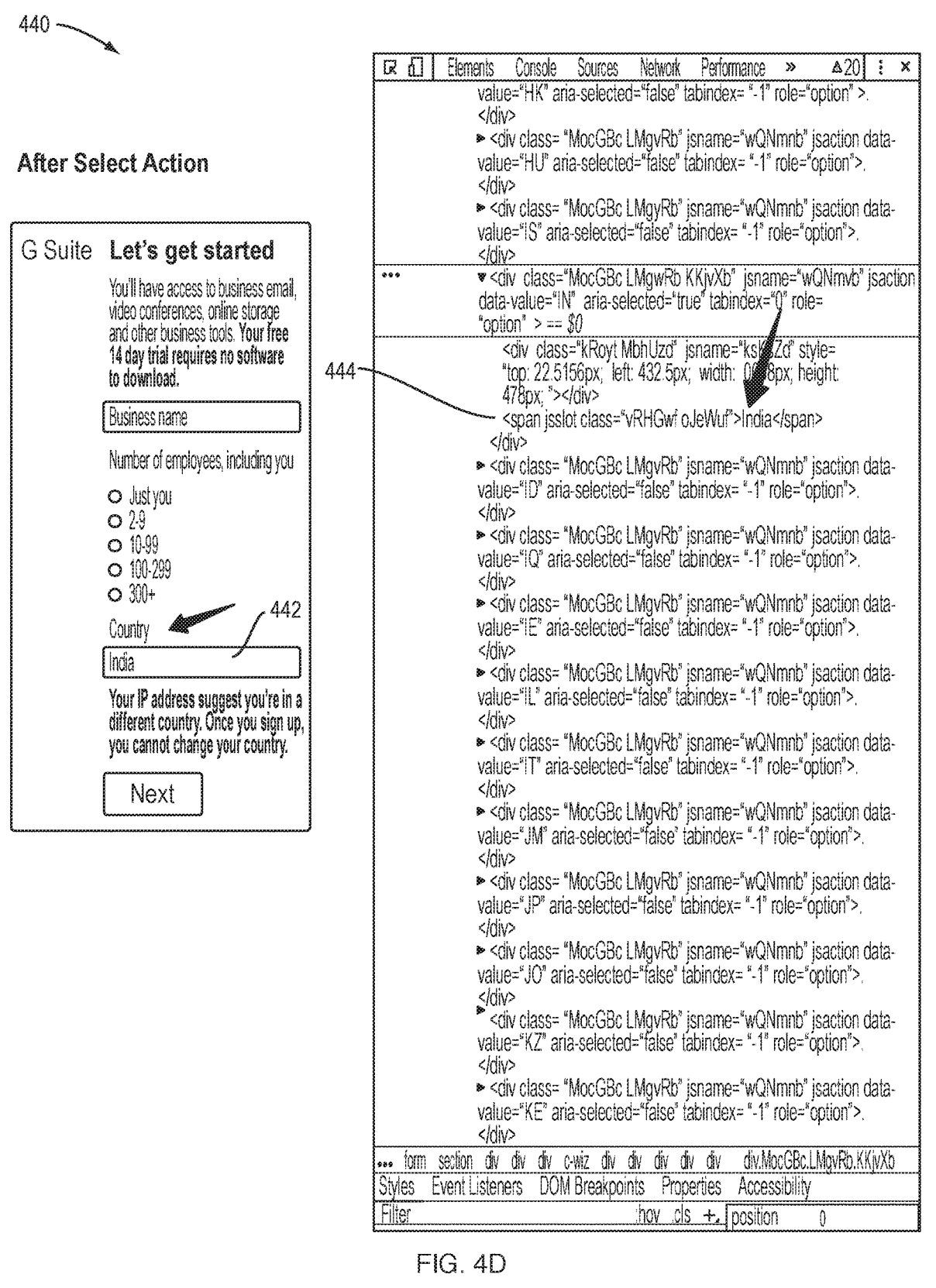

Referring to FIG. 4C, the automation tool 110 may receive a test script 120 having a step to select a dropdown menu (e.g. country selection dropdown 432) of a target application 150 (e.g. account set-up page 430). In this example, the automation tool 110 first identifies an associated handler 220 by evaluating the action attribute specified in the step. The associated handler 220 is identified as a "Select" handler (see Table 2). The "Select" handler then searches through the DOM of the account set-up page 430 and locates the country selection dropdown DOM element 434 based on the element attribute provided in the step. Referring now to FIG. 4D, the "Type" handler then simulates selecting the specified value attribute into the country selection dropdown 432 of FIG. 4C by modifying a targeted DOM element attribute 444 resulting in the country selection dropdown 422 of "India".

Figure 5:
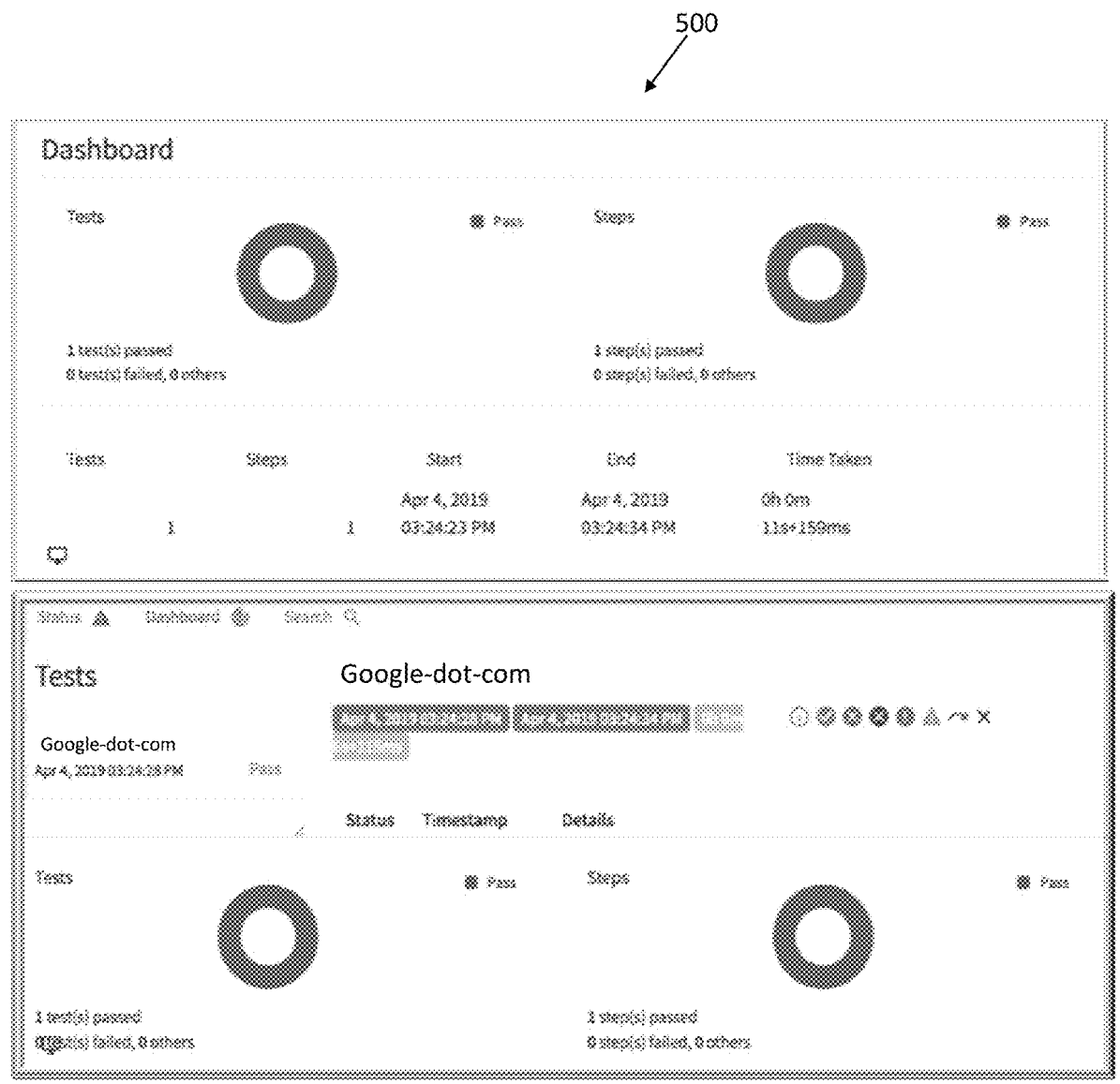
FIG. 5 is an example test report generated by the system of FIG. 1 according to at least one embodiment of the invention.

The test reports 140 may be automatically generated once the automation tool 110 has finished running the specified test script 120. The automation tool 110 may email test reports 140 to a recipient automatically after the test report 140 is created. In one embodiment, the automation tool 110 may require user authorization before emailing the test report 140. The test reports 140 may on one page be configured to show the results of a test in a graphical format such as in the example report 500 of FIG. 5. Other forms of graphically representing pass/fail information may be used (e.g. bar graphs), and other information aside from pass/fail percentage may be visually presented (e.g. time series plots). Test reports 140 may optionally include date and time information, total number of tests run and other metrics. The test reports 140 may include on another page details regarding each failed test including at which step the test failed which may include errors generated by the web-application or web-browser.

By defining the steps associated with the test script 120 by the action attribute, element attribute and value attribute as described above, there may be no need for the end user to have a high level of programming knowledge. An end user creating a test script 120 may only need to know what action they wish the automation tool 110 to take, what the unique identifier is for a target element, and what input data may be needed. The automation tool 110 may then be run to execute the test script 120, having any combination of steps defined by recognized and valid attributes, without the need for any additional programming. Thus, an end user may fully automate the testing of a target application 150 and generate test results 140. An end user or team of testers utilizing the automation tool 110 as defined above may be able to complete automation testing within a shorter amount of time, without compromising the quality of the test, than if using existing automation frameworks which require additional programming and debugging.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

We claim:

1. A method of testing a web-based application, the method comprising:
    at a computing device:
        receiving a test procedure for testing the web-based application, the web-based application having an associated web-based application user-interface code, the test procedure including at least one testing step, each of the at least one testing steps being one of: an interaction testing step and an expectation testing step, each of the at least one testing steps including at least an action attribute and an element attribute, wherein the element attribute identifies a unique web element of the web-based application user-interface code, and wherein the action attribute corresponds to an action to be performed on the section of web-based application user-interface code;
        for each of the at least one testing steps:
            identifying an action handler based on the action attribute;
            generating at least one instruction, by the action handler, based on the action attribute and in accordance with a determination that the testing step is an interaction testing step and that there is a value attribute associated with the interaction testing step, modifying the at least one instruction based on the value attribute associated with the interaction testing step; and
            causing a web-driver to execute the at least one instruction on an identified section of web-based application user-interface code corresponding to the unique web element identified by the element attribute to perform an operation on the web-based application.

2. The method of claim 1, wherein the at least one testing step includes a first step and a last step, the first step being an interaction testing step and the last step being an expectation testing step.

3. The method of claim 1, wherein the element attribute corresponds to a unique identifier of a web element of the web-based application.

4. The method of claim 1, wherein the test procedure is a non-compilable test script written by a user with no experience drafting computer source code.

5. The method of claim 1, wherein the operation on the web-based application includes: a web page opening operation, a wait operation, a type operation, a click operation, and/or an operation to extract a value from the web-based application.

6. The method of claim 1, wherein when the testing step is an open web-application step:
    generating the at least one instruction includes:
        generating a first instruction and a second instruction and causing the web-driver to execute the first instruction to open an associated web-browser,
    modifying the at least one instruction includes:
        modifying the second instruction to include a web-page name based on the value attribute, and
    causing the web-driver to execute the at least one instruction includes:
        executing the second instruction with the web-page name based on the value attribute to open the web-based application.

7. The method of claim 1, wherein when the testing step is a type step:
    modifying the at least one instruction includes:
        modifying the at least one instruction to include a text string based on the value attribute, and
    causing the web-driver to execute the at least one instruction includes:
        modifying the section of web-based application user-interface code to simulate typing the text string into a text field of a respective element corresponding to the element attribute in the web-based application user-interface code.

8. The method of claim 1, wherein when the testing step is a click step, causing the web-driver to execute the at least one instruction includes modifying the section of web-based application user-interface code to simulate a mouse-click action at an element representative of the element attribute in the associated web-based application user-interface code.

9. The method of claim 1, wherein when the testing step is a wait step, modifying the at least one instruction includes modifying the at least one instruction to include a number value based on the value attribute, causing the web-driver to execute the at least one instruction includes causing the web-driver to wait an amount of time corresponding to the number value.

10. The method of claim 1, wherein when the testing step is a select step, modifying the at least one instruction includes modifying the at least one instruction to include a text string based on the value attribute, causing the web-driver to execute the at least one instruction includes causing the web-driver to select one option of a plurality of options corresponding to the text string on the associated web-based application user-interface code.

11. The method of claim 1, wherein when the testing step is an expectation step, causing the web-driver to execute the at least one instruction includes causing the web-driver to extract a respective value characteristic from the web-based application and compare the value characteristic to the value attribute to determine whether there is a match and in response to determining that there is a match, updating a testing script metric to indicate a successful testing step and in response to determining that there is no match, updating a testing script metric to indicate an unsuccessful testing step.

12. The method of claim 1, wherein the action attribute may correspond to a list of predetermined action attributes.

13. A system for testing a web-based application, comprising:
    one or more memory units each operable to store at least one program; and
    at least one processor communicatively coupled to the one or more memory units, in which the at least one program, when executed by the at least one processor, causes the at least one processor to perform the steps of:
        receiving a test procedure for testing the web-based application, the web-based application having an associated web-based application user-interface code, the test procedure including at least one testing step, each of the at least one testing steps being one of: an interaction testing step and an expectation testing step, each of the at least one testing steps including at least an action attribute and an element attribute, wherein the element attribute identifies a unique web element of the web-based application user-interface code, and wherein the action attribute corresponds to an action to be performed on the section of web-based application user-interface code;

for each of the at least one testing steps:
identifying an action handler based on the action attribute;
generating at least one instruction, by the action handler, based on the action attribute and in accordance with a determination that the testing step is an interaction testing step and that there is a value attribute associated with the interaction testing step, modifying the at least one instruction based on the value attribute associated with the interaction testing step; and
causing a web-driver to execute the at least one instruction on an identified section of web-based application user-interface code corresponding to the unique web element identified by the element attribute to perform an operation on the web-based application.

14. The system of claim 13, wherein the at least one testing step includes a first step and a last step, the first step being an interaction testing step and the last step being an expectation testing step.

15. The system of claim 13, wherein the element attribute corresponds to a unique identifier of a web element of the web-based application.

16. The system of claim 13, wherein the test procedure is a non-compilable test script written by a user with no experience drafting computer source code.

17. The system of claim 13, wherein the operation on the web-based application includes: a web page opening operation, a wait operation, a type operation, a click operation, and/or an operation to extract a value from the web-based application.

18. The system of claim 13, wherein when the testing step is an open web-application step:
generating the at least one instruction includes:
generating a first instruction and a second instruction and causing the web-driver to execute the first instruction to open an associated web-browser,
modifying the at least one instruction includes:
modifying the second instruction to include a web-page name based on the value attribute, and causing the web-driver to execute the at least one instruction includes:
executing the second instruction with the web-page name based on the value attribute to open the web-based application.

19. The system of claim 13, wherein when the testing step is a type step:
modifying the at least one instruction includes:
modifying the at least one instruction to include a text string based on the value attribute, and
causing the web-driver to execute the at least one instruction includes:
modifying the section of web-based application user-interface code to simulate typing the text string into a text field of a respective element corresponding to the element attribute in the web-based application user-interface code.

20. The system of claim 13, wherein when the testing step is a click step, causing the web-driver to execute the at least one instruction includes modifying the section of web-based application user-interface code to simulate a mouse-click action at an element representative of the element attribute in the associated web-based application user-interface code.

21. The system of claim 13, wherein when the testing step is a wait step, modifying the at least one instruction includes modifying the at least one instruction to include a number value based on the value attribute, causing the web-driver to execute the at least one instruction includes causing the web-driver to wait an amount of time corresponding to the number value.

22. The system of claim 13, wherein when the testing step is a select step, modifying the at least one instruction includes modifying the at least one instruction to include a text string based on the value attribute, causing the web-driver to execute the at least one instruction includes causing the web-driver to select one option of a plurality of options corresponding to the text string on the associated web-based application user-interface code.

23. The system of claim 13, wherein when the testing step is an expectation step, causing the web-driver to execute the at least one instruction includes causing the web-driver to extract a respective value characteristic from the web-based application and compare the value characteristic to the value attribute to determine whether there is a match and in response to determining that there is a match, updating a testing script metric to indicate a successful testing step and in response to determining that there is no match, updating a testing script metric to indicate an unsuccessful testing step.

24. The system of claim 13, wherein the action attribute may correspond to a list of predetermined action attributes.

* * * * *